United States Patent [19]

Stahl

[11] Patent Number: 4,710,658

[45] Date of Patent: Dec. 1, 1987

[54] CONNECTION SOCKET FOR A SUBMERSIBLE ELECTRIC MOTOR

[75] Inventor: Torvald Stahl, Alvsjo, Sweden

[73] Assignee: ITT Industries, Inc., New York, N.Y.

[21] Appl. No.: 919,749

[22] Filed: Oct. 16, 1986

[30] Foreign Application Priority Data

Oct. 23, 1985 [SE] Sweden ................. 8504983

[51] Int. Cl.⁴ ................ H02K 5/10; H02K 3/50
[52] U.S. Cl. ........................ 310/71; 310/87; 439/271
[58] Field of Search ............. 29/596; 310/71, 87, 310/89; 339/94 R, 94 M

[56] References Cited

U.S. PATENT DOCUMENTS

| | | | |
|---|---|---|---|
| 2,684,401 | 7/1954 | Roeser | 310/71 |
| 2,897,763 | 7/1959 | Wright | 339/94 R |
| 2,919,420 | 12/1959 | Snodgrass et al. | 339/94 R |
| 3,375,481 | 3/1968 | Parnell | 339/94 M |
| 3,602,748 | 7/1971 | Locke | 310/71 |

Primary Examiner—Patrick P. Salce
Assistant Examiner—D. L. Rebsch
Attorney, Agent, or Firm—Menotti J. Lombardi

[57] ABSTRACT

A connection socket for a submersible electric motor includes a connection box of the motor provided with two plates, one of which holds connection pins. The other plate is arranged to divide the connection box into two sealed rooms to prevent liquid coming into the box along the electrical cable from going further into the motor.

1 Claim, 2 Drawing Figures

CONNECTION SOCKET FOR A SUBMERSIBLE ELECTRIC MOTOR

BACKGROUND OF THE INVENTION

This invention concerns a connection socket for an electric connection to a submersible electric motor or generator.

Connection sockets for this purpose are, especially with big machines, made of an insulated plate provided with a number of pins for the electric conductors which are cast within the plate. At the underside of the plate, the connectors from the electric motor are attached. On the other side of the plate the conductors from a motor cable are connected. The pins are arranged in a waterproof manner in the insulated plate and the latter is in its turn waterproof-mounted in the wall of the connection box. In this way two independent waterproof insulated chambers are obtained which means that incoming liquid in the upper chamber is prevented from going into the lower chamber and into the motor.

When mounting the plate, the conductors at the underside are first connected to the pins, and then the plate is mounted. This means that the conductors at the underside must be relatively long to make the mounting possible. When the plate thereafter is mounted, the conductors are packed under the plate and may be squeezed or bent in a non-suitable way, thus damaging the insulated.

SUMMARY OF THE INVENTION

The disadvantages of the prior art are overcome by means of the present invention which provides a connection socket in a connection box for a submersible electric motor comprising a first plate, at least one connection pin having two opposed ends, one end being mounted in the first plate, the pin receiving therein electrical conductors which extend through the first plate and into the pin, and including means for joining the electrical conductors to the pin, and having means for joining to the pin electrical conductors which extend through the first plate and into the pin, and a second plate positioned opposite to the first plate and through which the other end of the pin extends, to permit an electrical cable to be joined to the electrical conductors.

BRIEF DESCRIPTION OF THE DRAWING

Above-mentioned and other features and objects of this invention will become more apparent by reference to the following description taken in conjunction with the accompanying drawings, in which.

DESCRIPTION OF THE PREFERRED EMBODIMENT

Figure 1:
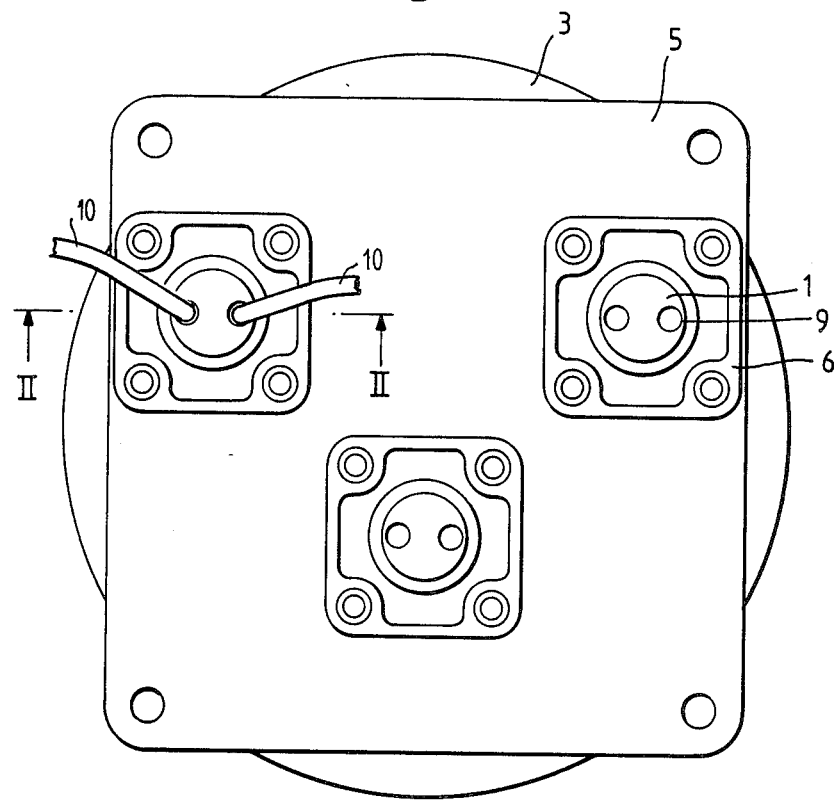
FIG. 1 shows a device according to the invention seen from above.
Figure 2:
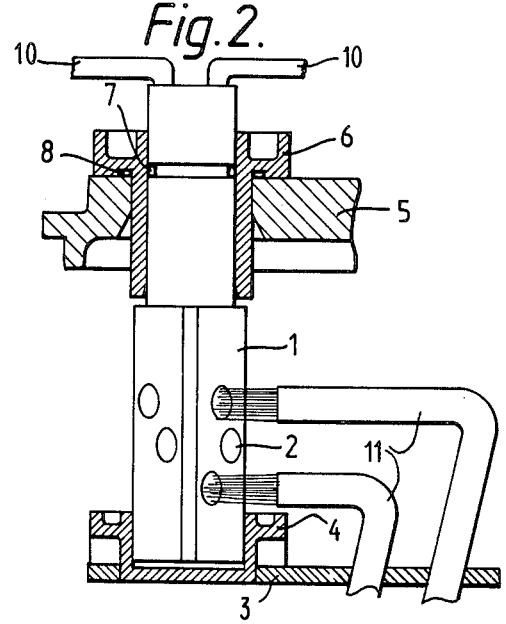
FIG. 2 shows a vertical section of a part of the device.

In the drawings a connection pin 1 has a hole 2 for a conductor. A lower plate 3 has insulated holders 4 for the pin 1. There are also shown an upper plate 5, another insulated holder 6 and o-rings 7 and 8.

According to the invention, the method insulated plate is replaced by two plates 3 and 5. The lower plate 3 is put on its place and the pins 1 are mounted on the plate with the aid of a holder 4. The plate 3 and the holder 4 now serve to stabilize the pins during the mounting. The conductors 11 from the electric motor which are brought up through the plate 3 are connected to the pins 1 by means of holes 2 in any suitable soldering or mechanical manner. Superfluous ends are cut and the conductors are so arranged that there is no risk of squeezing or bending. Then the upper plate 5 is brought downwardly over the pins, the holes in the plate being somewhat wider than the pins to facilitate the mounting. A supporting and sealing holder 6 of insulating material is brought downwardly over each pin and is connected to the plate 5 by screws. In order to secure a perfect sealing, O-rings 7 and 8 respectively are arranged between the pin 1 and the holder 6 and between the holder 6 and the plate 5. Since the holder 6 is made of insulated material the plate 5 may be manufactured of some other material such as cast-iron.

The plate 5 is then sealingly attached to the connection box and an entirely waterproof dividing of the housing has now been obtained. The connection of incoming conductors 10 to the upper parts of the pins 1 is made by connection means 9 in the usual soldering or mechanical manner.

The big advantage with the device according to the invention is thus that all connections and mountings may be made under full control and there is no risk of squeezing or bending of the conductors.

While I have described above the principles of my invention in connection with specific apparatus, it is to be clearly understood that this description is made only by way of example and not as a limitation to the scope of my invention as set forth in the objects thereof and in the accompanying claims.

I claim:

1. A connection socket in a connection box for a submersible electric motor comprising in combination:
    a first upper plate having a plurality of first mounting holes;
    a second lower plate having a plurality of second mounting holes;
    a first upper insulated holder mounted in one of said plurality of first holes;
    a second lower insulated holder mounted in one of said plurality of second holes;
    a connection pin, one end being mounted in said first insulated holder and another end being mounted in said second insulated holder, said one end having first connection means for connecting to incoming conductors, and said connection pin having second connection means adjacent said other end and positioned between said first and second plates for connecting to conductors from the electric motor;
    said connection pin having adjacent said one end a peripheral groove for retaining a sealing ring between said pin and said first holder;
    said first insulated plate having another peripheral groove for retaining another sealing ring between said first insulated plate and said first upper plate, whereby liquid is prevented from entering the chamber formed by said first and second plate from said one end of said connection pin.

* * * * *